Patented Sept. 7, 1948

2,448,510

UNITED STATES PATENT OFFICE 2,448,510

CHLORINATION OF STARCH AND PRODUCTS THEREOF

Harold Nathan Barham, Manhattan, Kans., assignor to Sharples Chemicals Inc., Philadelphia, Pa., a corporation of Delaware No Drawing. Application February 20, 1945, Serial No. 578,957

28 Claims. (Cl. 260—209)

The present invention relates to the chlorination of starch and to the products of such chlorination. The principal products of this invention are starch chlorides which, structurally, are alpha-chloro ketones and aldehydes, and in their higher forms of chlorination are further chlorinated derivatives of such ketones and aldehydes. The invention includes also, however, certain chlorohydrins and hypochlorites formed by the chlorination reaction.

The invention provides a process which can be used to form chlorinated starch products of substantially definite and uniform composition, which are distinguished from prior products of chlorination of starch in these particulars and in the further particular that they are reactive, and hence may be employed in synthesis of a variety of other products. This reactivity is attained by attachment of chlorine directly to the glucoside units of the starch molecule.

The treatment of starch with various agents designed to effect halogenation of the starch is well known and has been practiced for many years. Such processes have, however, insofar as I am aware, been designed to affect the physical properties of the starch in a desired way, rather than to form halogen compounds by reaction of halogens with the starch, and they have involved use of halogen compounds such as hypochlorous acid, alkali metal hypochlorites and gaseous chlorine, as the treating agents. They have, for the most part, had as their objective either the bleaching of the starch or modification of the solubility of the starch in water or of its viscosity in aqueous solution. While there are many references to treatment of starch with halogen compounds, very little has been done with respect to halogenation of starch in connection with scientific control of the process or products, or attempts to form products of fairly definite composition. From our experiments in use of gaseous chlorine as the chlorinating agent in treatment of the starch, we have found that the treatment is difficult to control, and difficulty is encountered in attempting to introduce a substantial amount of chlorine. The present invention provides the first process so far as I am aware, by which the chlorination reaction can be controlled to produce direct chlorination and provide products consisting essentially of mono-, di-, tri-, tetra- or hexa-chlorides, respectively, depending upon the desire of the operator.

In order to facilitate understanding of the invention, it will be described in connection with preferred operations for effecting chlorination of corn starch, with the understanding that, by minor adjustment, or even without such adjustment in many instances, the process may be modified to effect similar chlorination of starches of other types. While no two starches are identical, they are substantially similar because of the presence of the recurring glucoside units, and the general principles which apply to chlorination of corn starch, as discussed below, are applicable to the chlorination of other starches, and also to various raw materials containing such starches.

In the following detailed description, which is given solely for the purpose of illustration and without intent to limit the invention, I shall describe a typical chlorination operation involving a sequence of steps by which the starch may be converted into chlorinated products varying in chlorine content from one chlorine atom per glucoside unit to six chlorine atoms per glucoside unit. The starch under treatment in this operation may be considered to be a raw corn starch which is substantially anhydrous as a result of vacuum dehydration, and which has not been subjected to any chemical treatment or to any special physical disintegrating treatment other than the ordinary milling procedures.

The major steps of the reactions to which the starch is subjected in converting it into the mono-alpha-chloro ketone derivative, chlorinating this derivative to produce the di-alpha-chloro ketone derivative, and in turn chlorinating this derivative to form the corresponding products of higher degrees of chlorination containing 3, 4 and 6 chlorine atoms, respectively, per glucoside unit, may be represented by the following empiric equations:

I. $C_6H_{10}O_5 + Cl_2 \rightarrow C_6H_9O_5Cl + HCl$
II. $C_6H_9O_5Cl + Cl_2 \rightarrow C_6H_7O_5Cl + 2HCl$
III. $C_6H_7O_5Cl + Cl_2 \rightarrow C_6H_6O_5Cl_2 + HCl$
IV. $C_6H_6O_5Cl_2 + Cl_2 \rightarrow C_6H_4O_5Cl_2 + 2HCl$
V. $C_6H_4O_5Cl_2 + Cl_2 \rightarrow C_6H_3O_5Cl_3 + HCl$
VI. $C_6H_3O_5Cl_3 + Cl_2 \rightarrow C_6HO_5Cl_3 + 2HCl$
VII. $C_6HO_5Cl_3 + Cl_2 \rightarrow C_6O_5Cl_4 + HCl$
VIII. $C_6O_5Cl_4 + Cl_2 \rightarrow C_6O_5Cl_6$ The products of equations II, IV, VI, VII and VIII will be designated hereinafter as the starch mono-, di-, tri-, tetra-, and hexa-chlorides, and these compounds have the following chlorine contents:

(a) Monochloride (Equation II)—18.22% Cl.
(b) Dichloride (Equation IV)—31.24% Cl.
(c) Trichloride (Equation VI)—41.00% Cl.
(d) Tetrachloride (Equation VII)—48.26% Cl.
(e) Hexachloride (Equation VIII)—58.46% Cl.

As will be explained hereinafter, the operator can obtain a product consisting essentially of the starch monochloride (mono-alpha-chloro ketone derivative) or of these respective higher chlorides by conducting the chlorination until the desired amount of chlorine has combined with the starch molecule and by terminating the reaction at this point. He may also obtain products of intermediate degrees of chlorination short of the monochloride, or between the respective chlorides, by similar control of the percentage content of the chlorine of the product.

In the following detailed discussion of a specific operation in which any one of the various chlorides discussed above may be obtained, the products of the reaction will be identified by structural formulae, but discussion of the reasons for assigning these formulae to the products will, to a large degree, be deferred to a later point in the interest of simplicity.

In a simple illustrative case of practice of the invention, the following procedure has been followed.

15 grams of starch (0.0926 eq. mol.) are introduced into a closed reaction vessel of 1600 cc. capacity, capable of withstanding a pressure sufficiently high to maintain the subsequently introduced chlorine in liquid condition during the entire course of the reaction. 300 grams (4.23 moles) of liquid chlorine are thereafter introduced into the reaction vessel, this quantity of chlorine being sufficient to maintain the starch immersed in liquid chlorine under the conditions prevailing during the entire course of the chlorination reaction. The feature of maintaining the starch immersed in the liquid chlorine during the course of the reaction constitutes an important feature of the invention.

The reaction vessel is heated to a temperature of approximately 70° C. after the introduction of the chlorine and is maintained at this temperature for a number of hours. The original alpha-glucoside unit of the starch molecule may be designated conventionally as follows:

IX.

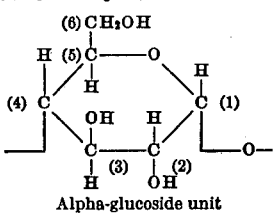

Alpha-glucoside unit

The initial reaction of the liquid chlorine on these glucoside units causes formation of products which may be designated as hypochlorites and chlorohydrins, respectively, of starch, and which have the following formulae:

X.

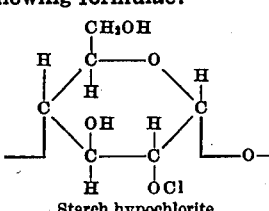

Starch hypochlorite

XI.

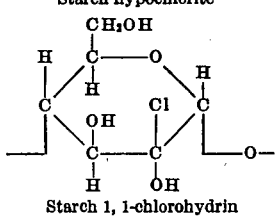

Starch 1, 1-chlorohydrin

XII.

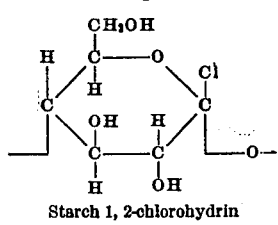

Starch 1, 2-chlorohydrin

During this stage of the reaction, it will be noted that, for each atom of chlorine which combines with the starch, one molecule of hydrogen chloride will be formed. Thus, the products illustrated by formulae X to XII are the products of Equation I.

After a period of heating with agitation to a temperature of 70° C. for some hours, the operator will note that the ratio of hydrogen chloride which has been formed to the chlorine combined with the starch increases above the value of 1:1 and ultimately reaches a value in the neighborhood of 3:1. The stage of the reaction at which this change commences may be reached after an operation of between seven and eight hours in the illustrative instance, and may occur when the chlorine content of the product accounts for approximately 7% of the weight of that product.

The reason for the increase in the ratio of hydrogen chloride formed to chlorine utilized may be understood by reference to the following equations, which represent reactions involving the hydrogen and hydroxyl radicals attached to the carbon atoms in the (1) and (2) positions or in the (3) and (4) positions. (While it is assumed, for the sake of simplicity, that the hydrogen atoms in the (1) and (2) positions are the first to be replaced by chlorine, experimental evidence does not definitely indicate whether these hydrogen atoms are replaced before the hydrogen atoms in the (3) and (4) positions.)

XIII. 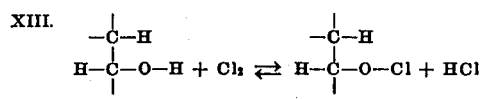

Hypochlorite

XIV. 

1, 1 chlorohydrin

XV. 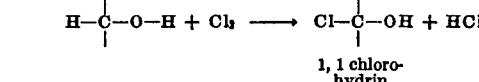

1, 2 chlorohydrin

XVI. 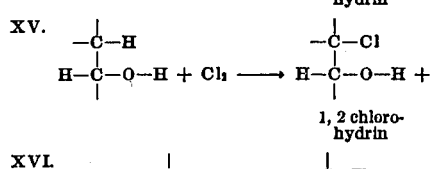

XVII. 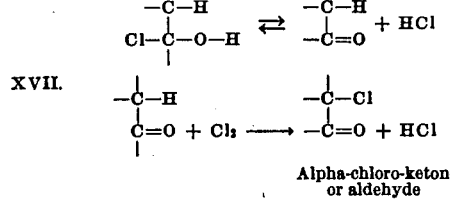

Alpha-chloro-ketone or aldehyde

The structure of Equation XVII is produced in Equations II, IV and VI, and the structure of Equations XIII, XIV and XV are produced in Equations I, III and V. The structure formed by Equation XVII is considerably more stable in liquid chlorine than the intermediate structure formed by Equation XIV. The starch monochloride formed in accordance with Equation II and containing the structure of Equation XVII may be designated structurally by either of the following formulae:

XVIII.

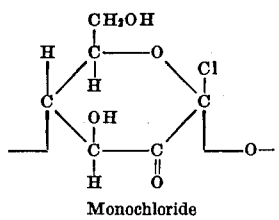
Monochloride or

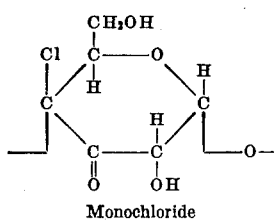
Monochloride

By reference to Equations XIV, XVI and XVII, which are believed to designate the principal sequence of reactions by which the desired starch monochloride is formed, it will be seen that this sequence involves formation of three molecules of hydrogen chloride for each atom of chlorine bound with the glucoside unit in the monochloride product. The beginning of the stage at which a product is formed having one atom of bound chlorine for three molecules of hydrogen chloride formed incident to formation of the product thus serves as an indication of the beginning of the formation of the desired starch monochloride. At the conclusion of the monochloride stage, analysis will show that the ratio of hydrogen chloride formed to chlorine bound conforms very closely to the 3:1 ratio.

In consideration of the sequence of reactions discussed above, the portion of the reaction period which is consumed substantially exclusively in getting the reaction started and forming the products of Formulae XI and XII will be designated as the induction period. As noted above, the termination of this period is marked by more rapid evolution of hydrogen chloride, and this period usually requires a number of hours, dependent upon specific detailed conditions to be discussed hereinafter. In the illustrative procedure under discussion, completion of the reaction to form the monochloride of Formula XVIII will require a period of four or five hours of heating after the end of the induction period, and completion of this monochloride stage will be indicated by the fact that the product will have a chlorine content of approximately 18.22%, and by the further fact that this product is characterized by a white color with a slight tinge of yellow. During the induction period, the starch under treatment gradually turns from white to a brownish tint, then grayish brown, then dark grayish brown, then black, until the induction period is completed. From a black color at the end of the induction period, the product gradually turns gray, and then white with a yellowish tinge, and the course of the reaction may be fairly determined by inspection of the color of the product at the various stages. As is well understood by those skilled in the art, the development of the white color indicates that the reaction has involved one and only one of the secondary alcohol groups, and the fact that there is only a faint trace of yellow in the product indicates that very little of the alpha-di-ketone product to be discussed hereinafter has, as yet, been formed.

If the monochloride is the ultimately desired product, a reaction product consisting essentially of the monochloride may be obtained by the simple process of cooling the reaction mixture to room temperature or below and thereafter removing chlorine and hydrogen chloride from the reaction vessel, when the monochloride stage has been reached. It should be noted at this point that it may, in some instances, be desired to form a product which has not yet, at least for the most part, reached the monochloride stage, and if this is the desire of the operator it may be attained by a similar simple cooling process followed by removal of excess hydrogen chloride and chlorine at any desired stage of the process of forming the monochloride. This termination of the chlorination reaction may be accomplished at a point even short of completion of the induction period, as some of the products (see Formulae XI and XII) of the induction period stage have a fair amount of stability, and these products may be used in organic syntheses, oxidation reactions, or for other purposes. The major object of this invention, however, is to produce materials containing in excess of 10% of chemically bound chlorine, and most of these products are characterized by the alpha-chloro ketone structure of Formula XVIII, in the 1, 2 and/or 3, 4 positions. The products of the more advanced chlorination reactions of the invention may be regarded as products of chlorination of the compounds of Formula XVIII and of subsequently formed compounds.

As noted above in discussion of the reaction products of Equation II, IV, VI, VII and VIII, the starch chlorides of more advanced stages of chlorination may correspond fairly closely in their chlorine content to the empiric formulae, and when the bound chlorine content of the starch reaction product corresponds approximately to these percentages, this product will consist essentially of the di-, tri-, tetra_ or hexachloride indicated in the above equations and in the formulae to be given hereinafter. The product in any such stage can be obtained by the same procedure as discussed above in connection with the monochloride, to wit, by simply cooling it and then removing unused chlorine and hydrogen chloride. It should also be noted, however, that products of intermediate degrees of chlorination between the respective degrees indicated by these formulae and equations may be obtained in practice of the invention, by cooling, and removal of excess chlorine and hydrogen chloride at an appropriate stage of the reaction, since the hypochlorite and chlorohydrins of already formed starch chlorides (alpha-chloro ketones) are formed as intermediate in formation of higher chlorination products, just as indicated by Equations XIII, XIV and XV in connection with the steps in production of the initial monochloride. This is illustrated by Equations III and V. From the above discussion, it will be evident that a chlorinated product may be obtained having any proportion of chlorine desired. In this connection, however, it should be noted that the intermediate forms are less stable than are the forms produced by the reactions of Equations II, IV, VI, VII and VIII, and that these intermediate forms lose chlorine in the form of HCl and $Cl_2$, to a certain extent at least, when the reaction is interrupted before completion of Equation II or intermediate between completion of Equations II, IV, VI, VII and VIII.

Assuming, now, that a product of a more advanced stage of chlorination than the monochloride is desired, it will be necessary only to continue the heating for a sufficient number of additional hours to effect the desired further chlorination. In the illustrative procedure, for example, chlorination to the dichloride stage can be completed by heating of the reaction mixture to a temperature of 70° C. for an additional period of 36 hours after the monochloride is formed. This term may be shortened by heating to a higher temperature. It is usually best that the product be not heated to a temperature above 100° C. if an undegraded product, i. e., a chlorinated product retaining the original linkage between glucoside units, is desired. Temperatures as high as 130° C. have, however, been successfully used. The fact that conversion of the monochloride to the dichloride requires a more prolonged treatment or more rigorous conditions than production of the monochloride facilitates control of the reaction, since this fact makes it possible to obtain a product of the monochloride stage which is fairly free of dichloride.

The reaction to form the dichloride becomes progressively slower at a given temperature as the end of the dichloride stage is approached, and if a fairly rapid reaction is desired, it is desirable that the temperature be somewhat increased toward the end of the dichloride stage. As noted, it is best that the temperature during the dichloride stage be kept below 100° C. if degradation is undesired. In some cases, however, there may be a desire to deliberately cause degradation in order to form glucose derivatives of lower molecular weight which can be converted into simpler products (the lower organic acids, for example), and in such cases degradation may be promoted by the use of high temperatures or by other details of procedure to be discussed hereinafter.

The color of the product changes gradually to a deep yellow as the chlorination proceeds from the monochloride to the dichloride stage. The dichloride, having a chlorine content of 31.24%, may be designated by the following formula:

XIX.
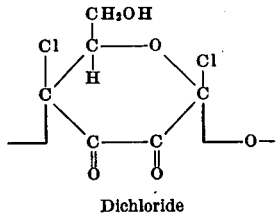
Dichloride

The trichloride stage may be completed by continuing heating of the dichloride product to a temperature of 70° C. or higher, as discussed above in connection with the dichloride stage. There is no perceptible color change during the trichloride stage, and the principal criterion of completion of this stage will therefore be the chlorine content of the product, which should be approximately 41% at completion of this stage. In our illustrative procedure, the dichloride product may be heated with the chlorine of the reaction mixture for 150 hours at a temperature of 70° C. or 18 to 24 hours at 90° C. to complete formation of the trichloride. The trichloride product may be designated by the following formula:

XX.
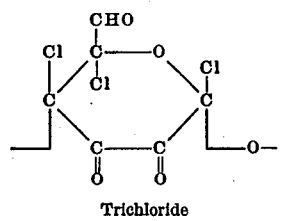
Trichloride

If the operator desires to continue the chlorination from the trichloride through the tetrachloride stage, this may be accomplished by continued heating. It is advisable to increase the temperature in this stage, since the reaction to form the tetrachloride requires more energy than do the preceding chlorination reactions. This stage may be completed, for example, by heating the trichloride product to 103° C. for a further period of 24 hours.

The tetrachloride, which may be formed by further chlorination of the trichloride, may be designated by the following formula:

XXI.
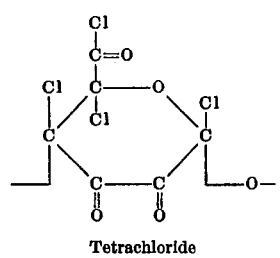
Tetrachloride

The tetrachloride product, like the di- and tri-chlorides, is yellow, and the chlorine content of the product (approximately 48.26%) is a criterion by which production of a material consisting essentially of the tetrachloride may be determined. The mono-, di- and tri-chlorides are characterized by a granular structure somewhat similar to that of the original starch, while the tetra- and hexa-chlorides have a more or less amorphous powdery condition.

The chemistry of the hexachlorides is less well understood than is that of the products of lower degrees of chlorination discussed above. These hexachloride products may be degraded or undegraded, as indicated by the following formulae:

XXII.
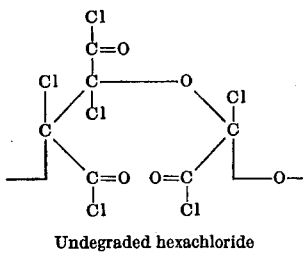
Undegraded hexachloride

XXIII.
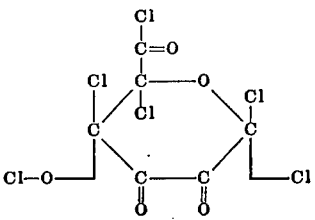

XXIV.

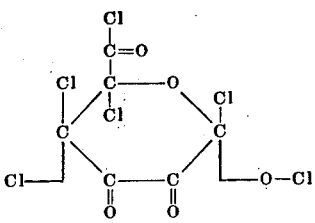

XXV.

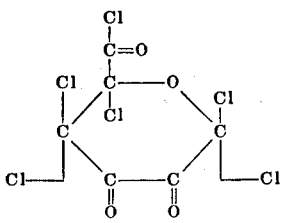

Degraded hexachlorides

Formula XXII indicating the undegraded triacid halide hexachloride product, while Formulae XXIII, XXIV and XXV represent the degraded products. In practical operation, it is believed that mixtures of all four of these products are almost invariably obtained, but formation of the degraded products may be favored by heating to a higher temperature. The hexachloride products may be formed by heating the tetrachloride to a temperature in the general range of 100–130° C. for a number of hours sufficient to increase the chlorine content to approximately 58.46%. Good results in this reaction have been attained by use of temperatures of approximately 125° C. The hexachloride product is a brown product, and the brown color is believed to be attributable to the degradation occurring in this final chlorination stage.

In the above illustrative discussion, the invention has been considered in terms of treatment of starch with an amount of chlorine capable of forming any of the desired chlorides, depending upon the stopping point. In practical operation, if one of the lower chlorides is desired, a much smaller ratio of chlorine to starch may be employed than that suggested in the above detailed discussion. An amount of chlorine constituting as little as ten chlorine molecules per glucoside unit or even lower may, for example, be employed in a batch operation designed to form the starch monochloride or products of still lower degrees of chlorination, and the only limitation on the amount of chlorine used is that this shall be sufficient to effect immersion of the starch under treatment. If very low ratios of chlorine to starch are employed it may be necessary to take an important precaution in the chlorinating operation during the monochloride stage. As noted above, during the induction period there is formed a molecule of hydrogen chloride for each molecule of chlorine which reacts with the glucoside unit, and the ratio of $HCl:Cl_2$ in the reaction mixture may increase rather rapidly during this period, and increases even more rapidly during the stage between the end of the induction period and the completion of monochloride formation. If, during any part of the reaction period prior to attainment of the monochloride condition, the ratio of $HCl:Cl_2$ exceeds a ratio of 1:6, the hydrogen chloride and chlorine react destructively on the starch to form carbon. It is therefore important that the ratio of $HCl:Cl_2$ be maintained below this destructive ratio until at least 18% of chlorine has become chemically bound to the starch. The ratio $HCl:Cl_2$ may be maintained within the desired limit even in cases in which the initial quantities of starch and chlorine would allow the limiting value of 1:6 to be exceeded as the reaction develops in the monochloride stage, by removing hydrogen chloride from the reaction mixture during the course of the reaction. A mixture of hydrogen chloride and chlorine may, for example, be removed from the reaction vessel before the hydrogen chloride content builds up to a destructive degree, and this removed material may be replaced with fresh chlorine, thereby increasing the ratio of chlorine to hydrogen chloride without use of a very large quantity of liquid chlorine at any time during the reaction. As an alternative to the above-suggested procedure, an equivalent result may be obtained by use of a fractionating column above the reaction vessel, this fractionating column being designed to operate under pressure and effect separation of hydrogen chloride from chlorine and return of liquid chlorine to the reaction vessel as the separated hydrogen chloride is discharged from the system. Such a fractionating column may be useful at various stages of the operation under which particular conditions are desired which require adjustment of the $HCl:Cl_2$ ratio.

The induction period in formation of the monochloride may be reduced very materially by adding hydrogen chloride to the reaction mixture, so long as care is taken not to add such a high amount of hydrogen chloride as to produce an $HCl:Cl_2$ ratio within the prohibitive range above 1:6 discussed above. Instead of adding hydrogen chloride to the reaction mixture at an early stage to reduce the induction period, the starch may be treated with hydrogen chloride as a preliminary to the reaction, and it has an effect in reducing the induction period in this case, just as in the case in which it is subsequently added. Hydrogen chloride, whether added before or during the reaction, thus acts catalytically to promote formation of the starch chlorides, by reducing the induction period.

Hydrogen chloride has another important effect during the course of the reaction, particularly in the stages subsequent to the monochloride stage. There is a certain tendency toward degradation of the starch, particularly in these more advanced stages, and the product usually contains a certain proportion of degraded chlorides in admixture with the chlorides in which the links between glucoside units have not been broken. If the operator has the desire (e. g., for formation of low molecular weight acids by subsequent hydrolysis for example) to prepare a product which is largely in a degraded condition, he should maintain the presence of hydrogen chloride in his chlorination reaction mixture at a low value by removal of hydrogen chloride. If, on the other hand, the operator desires to form a product which is undegraded and contains a minimum of degraded contaminants, he should maintain a higher ratio of $HCl:Cl_2$, the ratio of approximately 1:6, which is the maximum allowable ratio in the monochloride stage, having an optimum effect in preventing degradation in the higher stages.

The invention has been discussed above in terms of treatment of a starch which is in a substantially anhydrous condition. It is not to be inferred from this method of discussion that the presence of water is necessarily harmful; indeed the process may be used in treatment of ordinary commercial grades of starch containing as much as 20% of water, and it may be practiced in the presence of even higher proportions of water, so long as the essential feature of the invention, consisting of immersion of the starch in liquid chlorine, is observed.

The presence of small proportions of water varying from 0.1% to 6% (based on the weight of starch) is frequently desirable to effect a desired control of the reaction. When water is present in amounts within the above limits its serves to catalyze the reaction, particularly in the monochloride stage, by shortening the induction period and increasing the reaction rate greatly between the end of the induction period and the completion of the monochloride stage. It has been found that an amount of water between 1.5 and 2.5% has an optimum effect in this regard, and best results have been obtained in treatment of starches containing approximately 1.8% of water. When such an amount of water has been added under conditions otherwise the same as those discussed above in our illustrative instance, the induction period has been reduced to six hours, and the period from the end of the induction period to completion of the monochloride stage has required only one additional hour.

Another important feature in connection with the use of a small amount of water in the monochloride stage is the fact that this detail of operation facilitates formation of a monochloride product of a maximum degree of purity. This advantage results from the fact that, when water is present, the conversion of the monochloride to higher chlorinated products, and particularly to the dichloride, requires a greater amount of energy relative to that required for the monochloride stage. Thus, unless the temperature is increased upon completion of the monochloride stage in the presence of water, there is an abrupt retardation of the reaction upon completion of the monochloride stage, and this fact facilitates the obtaining of an unusually clean-cut monochloride fraction.

The following examples illustrate operations in which water was present in varying amounts during the chlorination reaction.

Example II 15 grams of starch plus 0.28 gram of water were introduced into the same reaction vessel as in the anhydrous example discussed above. 450 grams of liquid chlorine were introduced, and the starch was maintained immersed in the liquid chlorine during the entire reaction. The reaction mixture was maintained at a temperature of 70° C. for a period of eight hours, at which time the induction period had been completed and the reaction continued through the end of the monochloride stage and into the dichloride stage to a point at which the ratio of bound chlorine to glucoside units of the starch under treatment was 1.63:1. Comparison of this result with analogous runs under anhydrous conditions indicated that the reaction was greatly accelerated by the presence of the water. 3.82 moles of HCl per glucose unit were formed. The product was a homogeneous yellow powder.

Example III 15 grams of starch plus 0.92 gram of water were treated identically with the starch of Example II. The product contained 1.15 atoms of chlorine per glucoside unit. 4.47 moles of HCl per glucoside unit were formed. The product resembled that of Example II, but both of these products differed slightly in texture from products of similar degrees of chlorination of anhydrous starches. It will be noted that the product of Example III contained a lower proportion of bound chlorine than the product of Example II, although more hydrogen chloride was evolved in Example III than in Example II. This is attributable to the fact that Example III involved a higher degree of chlorination than Example II, but that a larger part of the chlorine was eliminated by interaction with water in Example III.

Example IV 15 grams of starch plus 1.53 grams of water were chlorinated identically with the starch of Example II. The product contained 1.69 atoms of chlorine per glucoside unit, and 3.30 moles of HCl per glucoside unit were formed. The chlorinated material was a heterogeneous brown solid.

Example V 15 grams of starch plus 12.38 grams of water were treated as in Examples II–IV. The product contained 1.69 atoms of chlorine per glucoside unit, and 5.19 moles of HCl per glucoside unit were formed. The chlorinated material was a wet heterogeneous mass of which the color ranged from yellow to orange to brown. It fumed when exposed to air, due to release of adsorbed hydrogen chloride.

As noted above, an important effect of the presence of water is that it shortens the induction period very materially. This material shortening occurs even in cases in which the initial treatment of the water-containing starch occurs at temperatures lower than those at which the desired chlorination reaction can be accomplished with reasonable rapidity (e. g. 50° C.). There is even an advantage, in treatment of the water-containing starch with chlorine at temperatures substantially below 70° C. in cases in which the desired product is a dichloride or product of higher chlorination, for the low temperature treatment, for some reason not fully understood, effects a change in the starch which makes it possible to accelerate subsequent conversion of the monochloride to higher chlorides.

This invention has been described above in terms of treatment of a starch which has not, prior to the chlorination, been subjected to any special chemical treatment or to any special physical disintegrating treatment other than the ordinary milling procedure, and which does not therefore fall into the category of starches known as disorganized starches. In treatment of starches which have been disorganized by special treatments of this kind, the induction period as well as the subsequent operations of the chlorination stages may be materially reduced, and the induction period may be reduced from hours to minutes by thorough preliminary disorganization.

The following theoretical discussion of the reaction and of the reasons for assigning the reaction mechanisms discussed above is given without intent to limit the invention because of such theoretical discussion.

It is believed that the product, except during its early stages, contains substantial quantities of the hypochlorite illustrated by the structure formed in Equation XIII, this assumption being verified by the oxidizing power of these reaction products.

The fact that the starch monochloride consists essentially of a monochloro ketone is indicated by the white color of this product, and the faintness of the tinge of yellow which it ordinarily contains indicates that it is probably contaminated with a very small quantity of the succeeding dichloride product, the yellow coloration being indicative of the alpha-diketone structure of the product of Formula XIX.

During conversion from the monochloride to the dichloride, the progressive development of the diketone structure of Formula XIX becomes progressively more evident by the progressive increase in the yellow coloration of the product. The alpha-diketone structure of the products of Formulae XIX, XX and XXI is further confirmed by the fact that these compounds react with O-phenylene diamine to give quinoxaline derivatives. The fact that the dichloride contains little or no aldehyde is indicated by a test of this product with Schiff's reagent, since in this test the product gives only a faint pink coloration with this reagent. The trichloride, on the other hand, gives a positive red color when subjected to this test, thereby indicating that the mono- and di-chlorides are alpha-chloro ketones, while, in formation of the tri-chloride, the primary alcohol group has been attacked to form an aldehyde, as illustrated by Formula XX. The presence of the acid halide radicals of the tetra- and hexa-chlorides is indicated by the fact that these compounds react with water in the cold to form organic acids.

At first blush, it seems surprising that a molecule as complex as that of starch, containing as it does a large number of glucoside units and a large variety of points of attack for the chlorine on the various units, should be susceptible of the treatment of the present invention to provide products as consistent in their characteristics and indications of structure as those discussed above. In this regard, it is pointed out that the success attained in these respects is attributable to the fact that the glucoside units, which are linked together to form the variable chains that constitute the starch molecules, which in turn are associated together to form the starch granule, are substantially the same, and the individual parts of these units vary similarly in their respective tendencies to react. By the proper choice of periods of treatment, temperatures, concentrations, catalysts, etc., the desired individual products can be produced in forms which are reasonably free from other stable products of higher degrees of chlorination, and from less stable products such as the intermediately formed hypochlorites and chlorohydrins. While different types and conditions of starch require adjustments in treatment periods and temperatures for optimum results, the same general principles apply to each.

While, as above noted, the formation of the various starch chlorides uncontaminated by each other, and contaminated only to a minor degree by intermediates, becomes a possibility in practice of the invention, it should be noted that practice of the invention does not require the highest degree of care to avoid contamination, since reaction mixtures containing a variety of constituents have potential industrial value as discussed below. Products containing from 17% of chlorine to an amount substantially in excess of 19% will consist essentially of the mono-chloride, those above 30% to a point substantially above 32% will consist essentially of the dichloride, those between 40% and a point substantially in excess of 41% will consist essentially of the trichloride, those between 47% and a point substantially in excess of 49% will consist essentially of the tetrachloride and those above 57% will consist essentially of the hexachloride.

While a feature of the invention consists in the use of liquid chlorine, it should be understood that the invention includes operations in which this liquid chlorine may contain an inert diluent. Carbon tetrachloride may, for example, be used as a diluent in practice of the invention.

While, in the above discussion, we have referred to temperature conditions which are preferred for treatment of raw starch which has not been subjected to any special treatment of disintegration, it should be noted that the temperature conditions herein set forth are not the only conditions which can be applied in practice of the invention. The chlorine reactions of the invention proceed slowly even at room temperatures, but temperatures in excess of 45° C. are recommended. The reaction to form the monochloride can be conducted with fair facility at any temperature between 55 and 90° C., and even within a broader range than this, provided a suitable catalyst or inhibitor be present.

The products of the invention may be put to a variety of uses. As pointed out above, the tetra- and hexa-chlorides will react with water, even in the cold, to yield several organic acids, of which one is oxalic acid. By hydrolyzing the lower starch chlorides and subsequently oxidizing the products of hydrolysis, a variety of organic acids may also be produced from these lower chlorides.

The starch hypochlorite products of the present invention are, as pointed out above, useful as oxidizing agents.

Since the products of the invention contain carbon-chlorine bonds, they may also be subjected to Friedel-Crafts reactions by which glucoside derivatives of aromatic hydrocarbons, phenols, etc., may be formed. An interesting application of the product of reaction of the starch chlorides with phenols consists in the fact that these products may be coupled with a diazotized amine, thereby producing colored compounds.

The chlorides of the invention are also capable of being reacted with organic and inorganic bases. Treatment with mild alkalies causes removal of some of the chlorine atoms, leaving a product of greater stability which is resistant to hydrolysis and which may be plasticized and incorporated into plastics of various types.

As noted in the introductory portion of this specification, a most important feature of the invention consists in the fact that it provides a mechanism by which the glucoside units of starch may be reacted to form a series of chlorinated products which, in their turn, are reactive with a great variety of organic and inorganic chemicals to form derivatives heretofore unavailable to the chemical industry.

The chlorinated products of the induction period which are obtained in practice of the present invention are soluble in water but are insoluble in alcohol, acetone and benzene. The monochlorohydrin obtained prior to attainment of the monochloride stage is slightly less soluble in water than the products obtained before this stage is reached and is somewhat soluble in 80% alcohol. It is insoluble in 100% alcohol and in acetone and benzene.

The monochloride reacts with cold water but is not soluble in water. The reaction of this monochloride with hot water results in formation of an insoluble yellow precipitate.

The dichloride is soluble in alcohol of either 80% or 100% concentration, is moderately soluble in acetone, but insoluble in water and benzene. The somewhat hydrated product of the dichloride stage, obtained by water catalysts and containing less chlorine than the dichloride, is very soluble in 80% alcohol, insoluble in benzene, and also soluble in 100% alcohol to an extent depending upon the amount of water used in the reaction mixture. Use of an increased amount of water in the reaction results in increased solubility in 100% alcohol.

The trichloride is soluble in cold alcohol of 80% or 100% concentration and in acetone, but is insoluble in hot water and benzene.

The tetrachloride is soluble in 80% or 100% alcohol, and in acetone, and is moderately soluble in benzene. The hexachloride is soluble in 100% alcohol, acetone and benzene.

In general, as the chlorine content of these various products increases, there is an increased solubility in hydrophobic solvents, such as benzene and 100% alchohol, a decreased solubility in water, and an increase in solubility in solvents of mixed character such as acetone and 80% alcohol.

Various modifications are possible within the scope of the invention, and I do not therefore wish to be limited except by the following claims.

I claim:

1. In the chlorination of starch, the process comprising maintaining the starch immersed in liquid chlorine maintained under super-atmospheric pressure until chemical combination between the starch and chlorine has occurred, said chemical combination resulting in the evolution of hydrogen chloride, and maintaining in the sphere of reaction a molecular ratio of chlorine to hydrogen chloride of at least approximately 6 to 1 during any stage of said chlorination when the degree of chlorination of said starch is less than 18%.

2. In the chlorination of starch, the process comprising maintaining the starch immersed in liquid chlorine maintained under super-atmospheric pressure until chemical combination between the starch and chlorine has occurred to produce an alpha-chloro carbonyl derivative of starch, said chemical combination resulting in the evolution of hydrogen chloride, and maintaining in the sphere of reaction a molecular ratio of chlorine to hydrogen chloride of at least approximately 6 to 1 during any stage of said chlorination when the degree of chlorination of said starch is less than 18%.

3. In the chlorination of starch, the process comprising maintaining the starch immersed in liquid chlorine maintained under super-atmospheric pressure until chemical combination between the starch and chlorine has occurred to produce an alpha-chloro ketone derivative of starch, said chemical combination resulting in the evolution of hydrogen chloride, and maintaining in the sphere of reaction a molecular ratio of chlorine to hydrogen chloride of at least approximately 6 to 1 during any stage of said chlorination when the degree of chlorination of said starch is less than 18%.

4. In the chlorination of starch, the process comprising maintaining the starch immersed in liquid chlorine maintained under super-atmospheric pressure until chemical combination between the starch and chlorine has occurred to form a starch derivative having in excess of 10% of chemically combined chlorine, said chemical combination resulting in the evolution of hydrogen chloride, and maintaining in the sphere of reaction a molecular ratio of chlorine to hydrogen chloride of at least approximately 6 to 1 during any stage of said chlorination when the degree of chlorination of said starch is less than 18%.

5. In the chlorination of starch, the process comprising maintaining the starch immersed in liquid chlorine maintained under super-atmospheric pressure until chemical combination between the starch and chlorine has occurred to form a starch derivative having in excess of 17% of chemically combined chlorine, said chemical combination resulting in the evolution of hydrogen chloride, and maintaining in the sphere of reaction a molecular ratio of chlorine to hydrogen chloride of at least approximately 6 to 1 during any stage of said chlorination when the degree of chlorination of said starch is less than 18%.

6. In the chlorination of starch, the process comprising maintaining the starch immersed in liquid chlorine maintained under super-atmospheric pressure until chemical combination between the starch and chlorine has occurred to form a starch derivative having in excess of 30% of chemically combined chlorine, said chemical combination resulting in the evolution of hydrogen chloride, and maintaining in the sphere of reaction a molecular ratio of chlorine to hydrogen chloride of at least approximately 6 to 1 until approximately 18% of chlorine has become chemically bound to the starch.

7. In the chlorination of starch, the process comprising maintaining the starch immersed in liquid chlorine maintained under super-atmospheric pressure until chemical combination between the starch and chlorine has occurred to form a starch derivative having in excess of 40% of chemically combined chlorine, said chemical combination resulting in the evolution of hydrogen chloride, and maintaining in the sphere of reaction a molecular ratio of chlorine to hydrogen chloride of at least approximately 6 to 1 until approximately 18% of chlorine has become chemically bound to the starch.

8. In the chlorination of starch, the process comprising maintaining the starch immersed in liquid chlorine maintained under super-atmospheric pressure until chemical combination between the starch and chlorine has occurred to form a starch derivative having in excess of 47% of chemically combined chlorine, said chemical combination resulting in the evolution of hydrogen chloride, and maintaining in the sphere of reaction a molecular ratio of chlorine to hydrogen chloride of at least approximately 6 to 1 until approximately 18% of chlorine has become chemically bound to the starch.

9. In the chlorination of starch, the process comprising maintaining the starch immersed in liquid chlorine maintained under super-atmospheric pressure until chemical combination between the starch and chlorine has occurred to form a starch derivative having in excess of 57% of chemically combined chlorine, said chemical combination resulting in the evolution of hydrogen chloride, and maintaining in the sphere of reaction a molecular ratio of chlorine to hydrogen chloride of at least approximately 6 to 1 until approximately 18% of chlorine has become chemically bound to the starch.

10. In the chlorination of starch, the process comprising maintaining the starch immersed in liquid chlorine maintained under super-atmospheric pressure until chemical combination between the starch and chlorine has occurred to form a starch derivative having in excess of 17% of chemically combined chlorine and comprising a mono-alpha-chloro ketone derivative of starch, said chemical combination resulting in the evolution of hydrogen chloride, and maintaining in the sphere of reaction a molecular ratio of chlorine to hydrogen chloride of at least approximately 6 to 1 during any stage of said chlorination when the degree of chlorination of said starch is less than 18%.

11. In the chlorination of starch, the process comprising maintaining the starch immersed in liquid chlorine maintained under super-atmospheric pressure until chemical combination between the starch and chlorine has occurred to form a starch derivative having in excess of 30% of chemically combined chlorine and comprising a di-alpha-chloro ketone derivative of starch, said chemical combination resulting in the evolution of hydrogen chloride, and maintaining in the sphere of reaction a molecular ratio of chlorine to hydrogen chloride of at least approximately 6 to 1 until approximately 18% of chlorine has become chemically bound to the starch.

12. In the chlorination of starch, the process comprising maintaining the starch immersed in liquid chlorine maintained under super-atmospheric pressure until chemical combination between the starch and chlorine has occurred to form a starch derivative having in excess of 40% of chemically combined chlorine and comprising a di-alpha-chloro ketone, mono-alpha-chloro aldehyde derivative of starch, said chemical combination resulting in the evolution of hydrogen chloride, and maintaining in the sphere of reaction a molecular ratio of chlorine to hydrogen chloride of at least approximately 6 to 1 until approximately 18% of chlorine has become chemically bound to the starch.

13. In the chlorination of starch, the process comprising maintaining the starch immersed in liquid chlorine maintained under super-atmospheric pressure at a temperature above 45° C. until chemical combination between the starch and chlorine has occurred, said chemical combination resulting in the evolution of hydrogen chloride, and maintaining in the sphere of reaction a molecular ratio of chlorine to hydrogen chloride of at least approximately 6 to 1 during any stage of said chlorination when the degree of chlorination of said starch is less than 18%.

14. In the chlorination of starch, the process comprising maintaining the starch immersed in liquid chlorine maintained under super-atmospheric pressure at a temperature above 70° C. until chemical combination between the starch and chlorine has occurred, said chemical combination resulting in the evolution of hydrogen chloride, and maintaining in the sphere of reaction a molecular ratio of chlorine to hydrogen chloride of at least approximately 6 to 1 during any stage of said chlorination when the degree of chlorination of said starch is less than 18%.

15. A process as defined in claim 1, in which the starch under treatment is immersed in a body of liquid chlorine constituting a molecular ratio of chlorine to glucoside units of at least 10:1.

16. A process as defined in claim 1, in which hydrogen chloride is removed from the zone of reaction during the progress of the chlorination.

17. A process as defined in claim 1, in which hydrogen chloride is introduced into contact with the chlorination reaction mixture at an early stage of the reaction, to catalyze the reaction.

18. A process as defined in claim 1, in which water, in an amount constituting less than 6% by weight of the starch under treatment, is maintained in the reaction mixture to assist in control of the reaction.

19. A process as defined in claim 1, in which water, in an amount constituting between 1.5 and 2.5% by weight of the starch under treatment, is maintained in the reaction mixture to assist in control of the reaction.

20. A process as defined in claim 1, in which the starch under treatment is in a substantially anhydrous condition.

21. A process as defined in claim 1, in which water, in an amount constituting less than 20% by weight of the starch under treatment, is maintained in the reaction mixture to assist in control of the reaction.

22. A chlorinated starch comprising starch monochloride and containing in excess of 17% of chlorine.

23. A chlorinated starch comprising starch dichloride and containing in excess of 30% of chlorine.

24. A chlorinated starch comprising starch trichloride and containing in excess of 40% of chlorine.

25. A chlorinated starch comprising a starch chloride containing at least 17% of chlorine.

26. A chlorinated starch product containing at least approximately 7% by weight of chemically bound chlorine.

27. A chlorinated starch product containing at least approximately 10% by weight of chemically bound chlorine.

28. A chlorinated starch product having molecules comprised of glucoside units containing approximately from 18.22% to 58.46% by weight of chemically bound chlorine.

HAROLD NATHAN BARHAM.

REFERENCES CITED

The following references are of record in the file of this patent:

UNITED STATES PATENTS

| Number | Name | Date |
|---|---|---|
| 1,851,749 | Bergquist | Mar. 29, 1932 |
| 2,108,862 | Kerr | Feb. 22, 1938 |

FOREIGN PATENTS

| Number | Country | Date |
|---|---|---|
| 534,112 | Great Britain | Feb. 27, 1941 |